United States Patent [19]

Baker et al.

[11] 4,194,519
[45] Mar. 25, 1980

[54] HYPERSONIC MODULAR INLET

[75] Inventors: Clifford B. Baker; James L. Keirsey, both of Rockville, Md.

[73] Assignee: The United States of America as represented by the Secretary of the Navy, Washington, D.C.

[21] Appl. No.: 412,267

[22] Filed: Nov. 18, 1964

[51] Int. Cl.² ............................................. F02K 11/00
[52] U.S. Cl. .................................. 137/15.1; 244/53 B; 60/270
[58] Field of Search ................ 60/270, 35.6 RJ, 22; 244/130, 53; 137/15.1, 15.2

[56] References Cited

U.S. PATENT DOCUMENTS

| | | | |
|---|---|---|---|
| 2,772,620 | 12/1956 | Ferri | 137/15.1 |
| 2,959,916 | 11/1960 | Carlton et al. | 137/15.1 |
| 3,069,119 | 11/1962 | Ferri | 244/130 |
| 3,080,707 | 4/1963 | Vetter | 137/15.1 |

*Primary Examiner*—Verlin R. Pendegrass
*Attorney, Agent, or Firm*—R. S. Sciascia; A. L. Branning

[57] ABSTRACT

This invention relates to a compact hypersonic modular inlet which divides a captured airstream and compresses it supersonically without the need for a variable geometry diffuser. According to the invention, an innerbody is provided with a plurality of perimetrically spaced inlet ducts which are defined by a single concave sidewall. The sidewalls intersect to form a center spike and radially directed, swept back leading edges. A cowling covers the inlets and is provided with a swept back leading edge adjacent to each duct, each leading edge having a profile conforming to a normal shock front.

8 Claims, 9 Drawing Figures

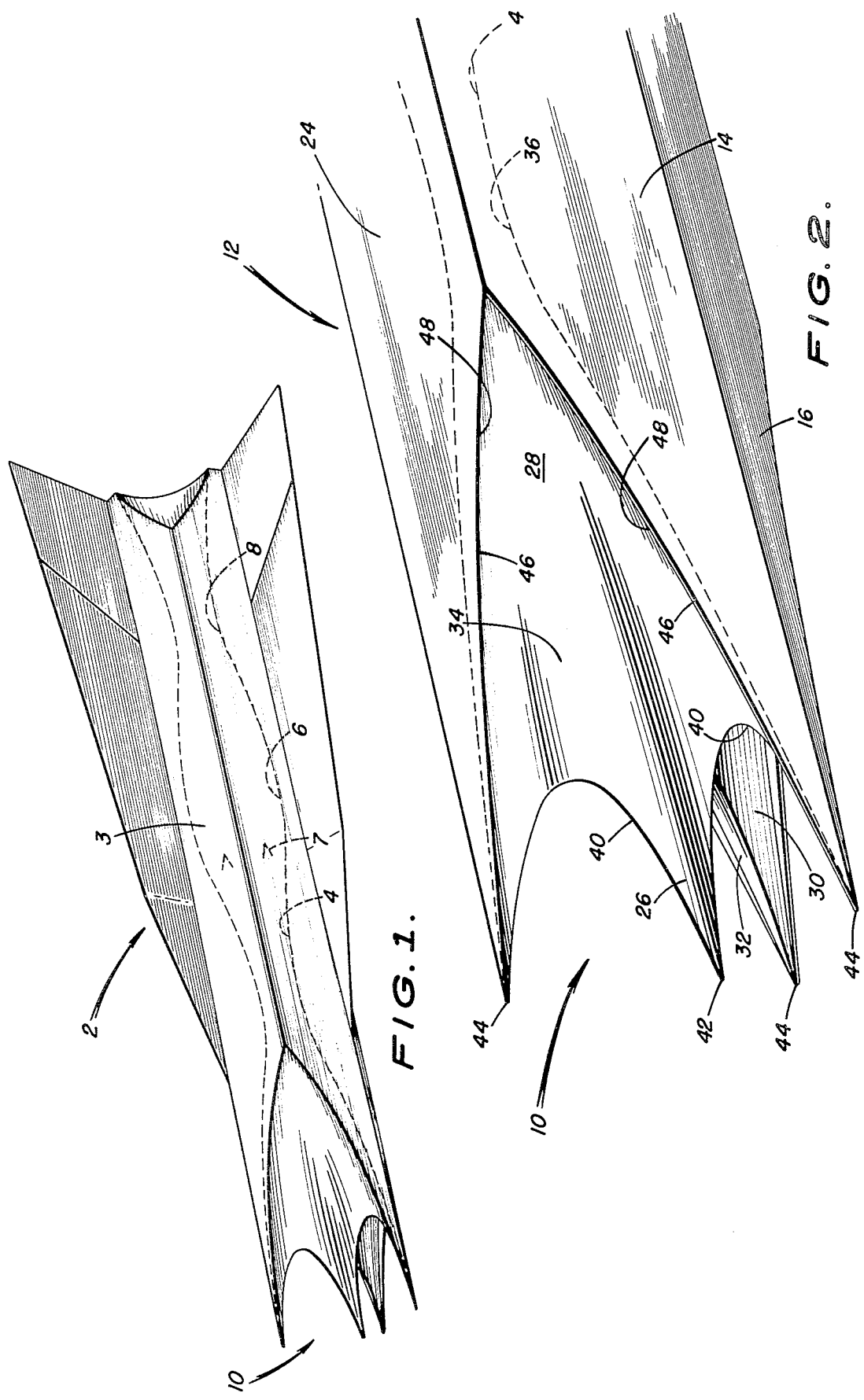

HYPERSONIC MODULAR INLET

The present invention relates generally to aerial vehicles, and more particularly to an improved modular inlet which captures free stream air and compresses it to flow into a number of ducts spaced about the perimeter of said vehicle.

In an aerial vehicle of the ramjet type the air inlet is a critical portion of the design, as the limitations of said inlet affect the overall efficiency of the entire vehicle. In the prior art the conventional ramjet engine operates in the Mach 2 to 4 range, using an inlet that compresses the air at first supersonically and then subsonically until the Mach number of the flow at the combustor inlet is reduced to about 0.2. Fuel is then injected, mixed with air, and burned, and the products of combustion expand subsonically to the nozzle throat, then supersonically through the exit.

In the conventional ramjet the major part of the kinetic energy of the inlet air is converted to potential energy (effectively stagnation pressure) before it enters the combustor. However, as speed is increased, the air compression becomes inefficient, and the stagnation temperature becomes intolerably high to permit efficient engine operation. These two effects restrict the usefulness of a conventional design to a maximum Mach number of about 10, depending on the fuel used and the engine design. It becomes apparent that a proper inlet design is essential to permit operation of the engine either as a subsonic or supersonic combustion engine at low flight Mach numbers, and provide the proper geometry for efficient operation as a hypersonic inlet for use with a supersonic combustion engine at high Mach numbers.

The inlet and internal flow ducts must be designed to provide an appropriate compression of the inlet air with minimum shock and boundary layer losses while being compatible with structural requirements. It becomes clear that fairly sharp leading edges will be required to mitigate drag losses, and that leading edges preferably will be swept at an acute angle to the air flow to minimize leading edge structure temperatures as well as reduce leading edge drag. Annular ducting should be avoided, to minimize internal wetted area. It is clear that a design which reduces the internal wetted area, for a given vehicle packaging volume, will have smaller internal viscous losses, thereby reducing the internal drag, the frictional heat build-up upon vehicle surfaces, the vehicle weight, and the volume of insulating material required. Many of the annular inlets utilized by the prior art employ a variable geometry to permit starting the ramjet engine while remaining able to capture enough air at cruising speed to sustain the vehicle. The instant invention seeks to achieve a solution to these problems through a fixed geometry, multi-ducted, design.

It is, therefore, the primary object of the present invention to provide a hypersonic modular inlet for an aerial vehicle which may be fabricated from simple geometric curves and planes thereby avoiding the complicated surfaces with compound curvature resulting from the tracing of streamlines to form the compression surfaces.

Another object of this invention is to provide, in an aerial vehicle, a hypersonic modular inlet having a minimum internal wetted area for a given vehicle packaging volume, thereby minimizing heat build-up due to friction, internal drag, weight, and the volume of insulating material required to protect the components.

Still another object of the instant invention is to provide an inlet means which will facilitate the starting of a ramjet or turbojet engine and the attaining thereby of hypersonic speed without adjusting the inlet geometry from initial starting conditions through final operational conditions.

It is a further object of this invention to establish an air inlet configuration utilizing a sharp leading edge to mitigate drag losses as well as a leading edge swept at an acute angle to the air flow to further reduce drag and lower the heat transferred to the inlet surface by air friction.

A still further object of the present invention is to provide an engine inlet concept which will allow compression of the air flow for either subsonic or supersonic combustor operation in the flight range of Mach 4 to 5.

It is another object of the present invention to provide a hypersonic inlet which avoids compressing the air to subsonic conditions at hypersonic speeds, thereby permitting efficient engine operation with supersonic combustion which alleviates the tendency toward boundary layer separation and improves angle of attack performance.

Other objects and many of the attendant advantages of this invention will be readily appreciated as the same becomes better understood by reference to the following description when considered in connection with the accompanying drawings, wherein:

FIG. 1 is a perspective view of an aerial vehicle having a hypersonic modular inlet according to the present invention;

FIG. 2 is a perspective view of the hypersonic modular inlet;

Figure 3:
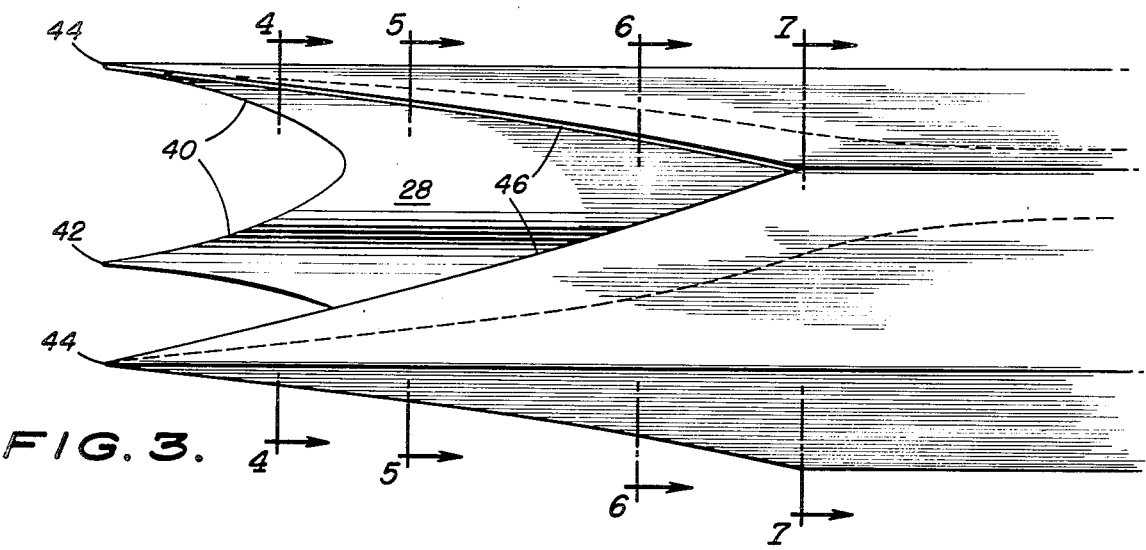
FIG. 3 is a side elevation of the invention.
Figure 4:
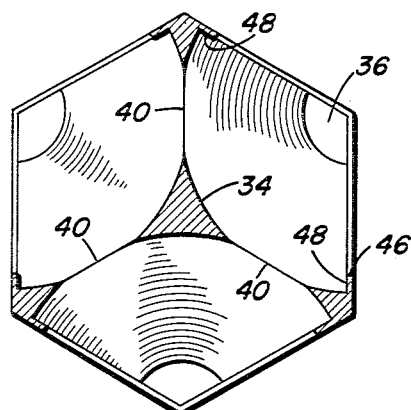
FIG. 4 is a sectional view taken along line 4—4 of FIG. 3.
Figure 5:
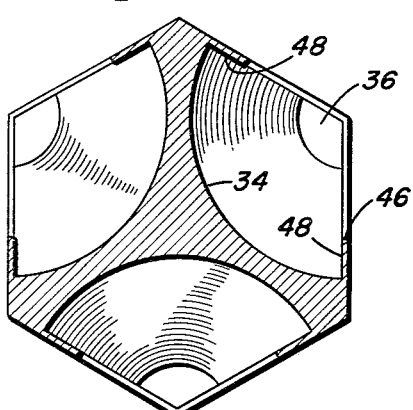
FIG. 5 is a sectional view taken along line 5—5 of FIG. 3.
Figure 6:
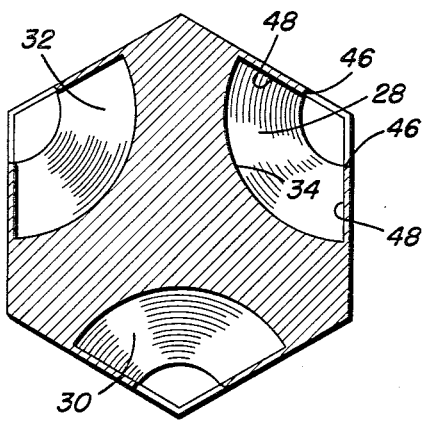
FIG. 6 is a section on the line 6—6 of FIG. 3.
Figure 7:
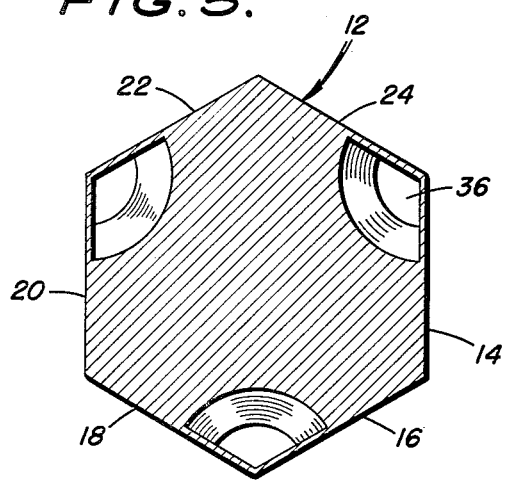
FIG. 7 is a detail section on line 7—7 of FIG. 3.

The invention teaches the use of a reverse DeLaval type, axi-symmetrical, compression field which has been divided into sectors and turned inside-out, in order to circumvent the ramjet starting problem. A reverse DeLaval type compression field may be described as an axi-symmetrical tube converging to a throat which compresses the free stream air supersonically as it flows therethrough. The term "starting," as herein applied, refers to the establishment of a supersonic flow from the inlet to the throat. Thus an "unstarted" reverse DeLaval diffuser refers to a mode of operation wherein the flow is reduced to subsonic conditions by a normal shock upstream of the diffuser. In this mode, the air capture is limited to that which can be passed through the throat area at sonic conditions, and at the total pressure behind a normal shock. The normal shock front limits the amount of air which may pass through the compression tube, thus reducing the air flow within the combustion chamber and starving a ramjet or turbojet engine at higher cruising speeds. The shock front also creates excessive drag, thereby reducing the range, speed, and efficiency of the aerial vehicle. To eliminate this problem the reverse DeLaval diffuser has been divided into three equal portions and each portion turned inside-out with the three sectorial portions of the axi-symmetrical diffuser tube located on the outermost portion of the newly shapen trimodular diffuser body. An outer cowling forms a perimeter around the diffuser body and encloses the three sectorial portions of the divided diffuser tube. Adjacent to each sectorial diffuser portion the cowling is formed into a V-shaped notch with its widest portion toward the forwardmost end of the aerial vehicle. The exact contour of the V-shaped notch is established by the configuration of the first compression wave propagated at the cruising speed of the vehicle inlet. This V-shaped notch allows the inlet to take in air at lower supersonic speeds without choking, due to the spillage aft of the normal shock front. The spillage through the notch of the normal shock front reduces the effect of that front and eliminates the engine starting problem.

Referring more particularly to the drawings, FIG. 1 shows the general outline of an aerial vehicle 2 comprising a body member 3 having air passages 4 communicating with a combustion chamber 6. Fuel is injected through fuel injectors 7 where it is mixed with the incoming air and burned in the combustion chamber 6 before it is exhausted through a nozzle throat 8. The incoming air is compressed by a trimodular inlet 10 at the forward end of the aerial vehicle 2. The details of the trimodular inlet 10 are shown in enlarged view constituting FIGS. 2–7.

As best illustrated in FIG. 2 and FIGS. 4–7, the trimodular inlet 10 is formed by a hexagonal cowling 12 having sides 14, 16, 18, 20, 22, and 24. Mounted inside the cowling 12 is a trimodular innerbody 26. In order to simplify an understanding of the construction of this trimodular innerbody, utilizing simple geometric shapes, imaging taking a hexagonal rod and boring a diffuser of the desired shape through the major axis of the rod. The hexagonal rod is then divided into equal 120 degree sectors along alternating rod edges and the sectors are reassembled with their trisected diffuser areas on the outermost portions of the assembly. In this reassembled position the diffuser sectors form the inlet ducts 28, 30, and 32 of FIGS. 4–7.

The inlet ducts, arranged symmetrically about the longitudinal axis of the aerial vehicle, are each of the same configuration and therefore only one inlet duct, the duct 28, will be described. A compression surface 34 of the inlet duct 28 initially confronts the free stream air. The compression surface 34 is a curved surface that abuts the cowling 12 to form a pie-shaped or sectorial cross-sectional inlet, with the cowling sides 14 and 24 forming the radii and the compression surface 34 forming the included arc. The sectorial cross-section of the inlet may be best observed in FIGS. 4 through 7 which show the compression surface 34 converging towards a throat 36. In each of these figures the throat 36, which is the narrowest portion of the sectorial inlet 28, is visible. The sectorial inlet duct 28 continues past the throat 36 and into one of the air passages 4 which communicate with the combustion chamber 6 of the aerial vehicle.

The intersection of the compression surface 34 of the sectorial inlet duct 28 with the same surfaces of the inlet ducts 30 and 32 forms a sharp leading edge 40 having the general sweeping curved shape of a hyperbola. These swept leading edges 40 converge towards the longitudinal axis of the innerbody 26 to form a central spike 42. Radiating from the central spike 42 the swept leading edges intersect the cowling 12 to form perimetrical spikes 44. The perimetrical spikes are located at the intersection of the cowling sides 14–16, 18–20, and 22–24 respectively.

The cowling 12, which encloses the innerbody 26 and forms the outer surface of each sectorial inlet duct, is notched adjacent each duct along the cowling sides 24–14, 16–18, and 20–22 respectively. The notch has the general configuration of a V and is formed by two swept cowling edges 46 comprising the legs of the V. These swept cowling edges 46 originate at the perimetrical spikes 44, pass across each cowling side at an acute angle to the longitudinal axis, and terminate at the intersection of the cowling sides 14–24, 16–18, and 20–22. The cowling edges 46 are defined by the first compression wave outwardly generated from the axi-symmetric field formed by the compression surface 34 at the design Mach number. The relative depth of the notch is controlled through proper design, also based upon the design Mach number. The compression surface 34 of the sectorial inlet duct 28 tapers towards the throat 36 at a lesser angle than the swept cowling edge 46, thereby forming a capture space 48 between the swept cowling edge 46 and the point where the compression surface 34 abouts the cowling sides. The capture space 48 starts at the forwardmost point of the perimetrical spikes 44, where its width is negligible, and increases to its maximum width at the base of the cowling notch. From the base of the cowling notch rearward the capture space merges into the outer wall of the sectorial inlet duct.

When operating at the designed cruising speed the angle of the swept cowling edge 46 is greater than or equal to the angle of the first compression wave, thereby swallowing the normal shock and allowing the maximum capture of free stream air by the modular inlet. At speeds below the design cruising speed, or design Mach number, the first compression wave is radiated back from the compression surface 34 at a greater angle than the sweep of the cowling edge 46, thus allowing the inlet to be "started" by adequate spillage aft of the normal shock. Due to its partial spillage aft, a shock front is unable to build up in front of the inlet and produce a phenomenon which would prevent sufficient air flow from entering said inlet, thereby curtailing engine starting. The configuration of the modular inlet allows all leading edges 40 and 46, to be sharp and swept back at an acute angle to the air flow entering said inlet. This is an advantageous feature, as a sharp swept leading edge reduces the drag on that edge as well as reducing heat transfer thereto.

The modular inlet, as described above, may be used on a vehicle designed to operate under either supersonic or subsonic combustion conditions. When operating in the subsonic combustion mode the modular inlet stabilizes a normal shock along the lip of the capture space, rather than swallowing it, as in the supersonic combustion mode. The modular inlet has been described as having a hexagonal cowling 12, but through a slight variation of the design the hexagonal cowling may be replaced by a cylindrical exterior. This adjustment imparts an additional throat flow distortion at the inlet, while increasing the structural strength of the vehicle. Obviously another closed tubular configuration may be chosen in lieu of the hexagonal or cylindrical cowling 12, if desired.

Figure 8:
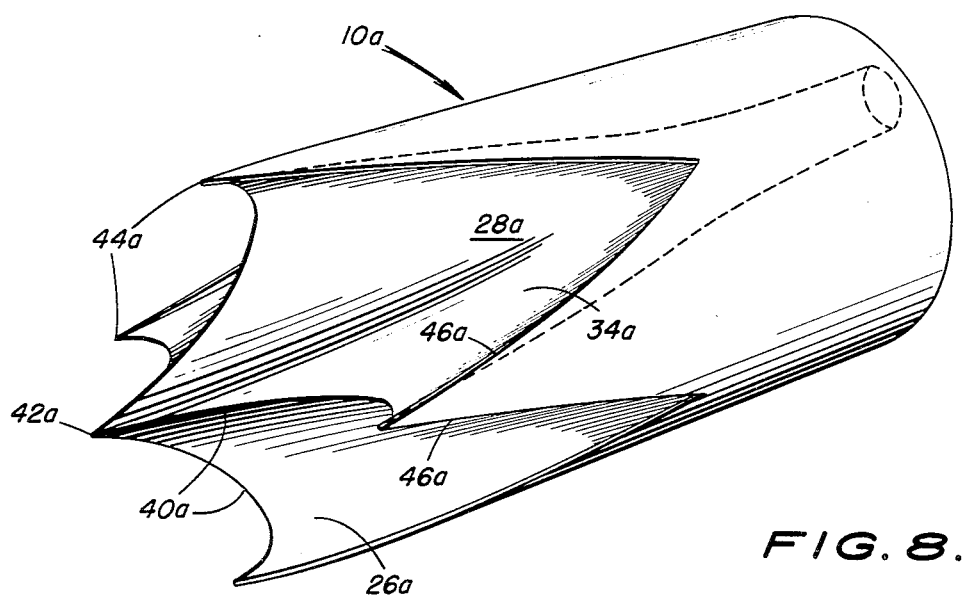
FIG. 8 is a perspective view illustrating a four-module inlet as a modified embodiment of the invention.
Figure 9:
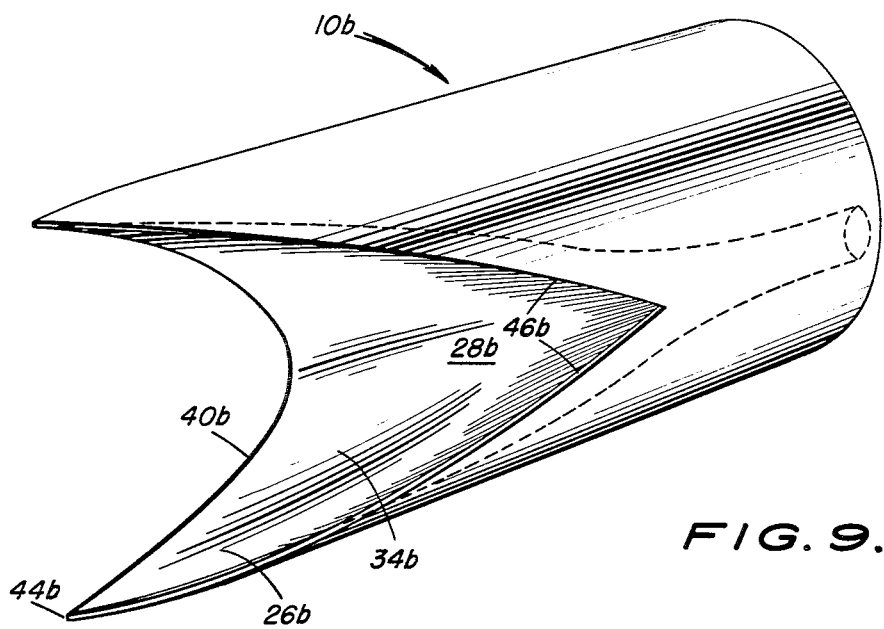
FIG. 9 is a perspective view showing another modification of the present invention in the form of a two-module inlet.

FIGS. 8 and 9 illustrate variations of the modular inlet constituting the present invention. In order to simplify an understanding of the embodiments shown in these views, the same reference numerals as those in FIGS. 1-7 have been used, with the addition of subscripts "a" in FIG. 8 and subscripts "b" in FIG. 9. Further description of the components and their relation to each other is therefore considered unnecessary. FIG. 8 shows a four-module inlet 10a, in which four axi-symmetric compression fields are used, one for each quadrant of air flow. In this design the inlet duct 28a does not have the advantage of being fabricated to use simple geometric curves, but rather must utilize compression surfaces which have been formed by the tracing of air flow streamlines at the design Mach number. The four-module inlet 10a does possess the sharp leading edges 40a, the notches formed by the swept cowling edges 46a, a central spike 42a, and the perimetrical spikes 44a, as taught by the trimodular inlet 10, FIG. 2. The inlet ducts are also formed by an outwardly directed compression surface 34a which guides the air flow into four equally spaced ducts arranged on the perimeter of the innerbody 26a.

A two-module inlet 10b is shown in FIG. 9. The inlet duct 28b is not fabricated to use simple geometric curves, as in the trimodular inlet. The embodiment does feature the sharp leading edge 40b, notches formed by the swept cowling edges 46b, and perimetrical spikes 44b, as taught by the trimodular inlet design. In the same manner as in trimodular inlet 10 and the four-module inlet 10a, the outwardly directed compression surface 34b guides the air flow into two ducts spaced equally on the perimeter of the innerbody 26b.

Obviously, many other modifications and variations of the present invention are possible in the light of the above teachings. It is therefore to be understood that within the scope of the appended claims the invention may be practiced otherwise than as specifically described.

What is claimed is:

1. In an aerial vehicle, a hypersonic modular inlet comprising
    an innerbody having a plurality of equally spaced inlet ducts extending longitudinally thereof, said inlets ducts having interior compression surfaces intersecting along the upstream end of said innerbody and forming hyperbolically curved leading edges between said inlet ducts, and
    a cowling surrounding said innerbody and enclosing said inlet ducts.

2. In an aerial vehicle, a hypersonic modular inlet, comprising
    an innerbody having a plurality of equally spaced inlet ducts extending longitudinally near the perimeter thereof, said ducts having interior compression surfaces intersecting each other along the forwardmost end of said innerbody and forming hyperbolically curved leading edges between said inlet ducts, and
    a cowling surrounding said innerbody and enclosing said inlet ducts, said cowling being notched adjacent each inlet duct thereby forming swept cowling edges.

3. In an aerial vehicle, a hypersonic modular inlet, comprising
    an innerbody having a plurality of equally spaced inlet ducts extending longitudinally thereof, said inlet ducts having interior compression surfaces intersecting one another along the upstream end of said innerbody thereby forming hyperbolically curved leading edges between each of said inlet ducts, and
    a cowling surrounding said innerbody and enclosing said inlet ducts, said cowling being notched adjacent each inlet duct, each said notch terminating short of its associated inlet duct for forming a capture space between said inlet duct and said cowling, each said notch having a taper conforming to a shock front outwardly generated from said adjacent inlet duct at a predetermined speed of said aerial vehicle.

4. In an aerial vehicle, a hypersonic modular inlet comprising
    an innerbody having three equally spaced inlet ducts extending longitudinally near the perimeter thereof, said inlet ducts having interior compression surfaces intersecting along the forwardly directed end of said innerbody thereby forming hyperbolically curved leading edges, said leading edges curving towards said forwardly directed end and terminating in a central spike and three perimetrical spikes,
    a cowling surrounding said innerbody and enclosing said inlet ducts, said cowling being notched adjacent each inlet duct, each said notch terminating short of its associated inlet duct thereby forming a capture space between said inlet duct and said cowling, each said notch having a taper conforming to a shock front generated from said adjacent inlet duct at a predetermined speed of said aerial vehicle.

5. A hypersonic inlet, comprising
    an innerbody for capturing an airstream, and
    a cowling surrounding said innerbody,
    said innerbody having therethrough a plurality of unconnected inlet ducts perimetrically spaced about the exterior of the innerbody and covered by said cowling for dividing a captured airstream into portions,
    each of said ducts being defined by a single concave sidewall, each sidewall providing a continuous compression surface for said duct,
    said concave sidewalls of said ducts intersecting each other, said innerbody including a plurality of radially extending leading edges and a coaxial spike at the intersection of said sidewalls.

6. The structure of claim 5 wherein each of said radially extending leading edges is provided with a swept back profile for reducing drag thereon and for facilitating a low rate of heat transfer thereto.

7. The structure of claim 6, wherein each portion of said cowling covering an inlet duct is provided with a swept back leading edge having a profile conforming to a normal shock front.

8. The structure of claim 7, wherein each inlet duct and the portions of said cowling covering each inlet duct define a capture space adjacent to a swept back leading edge of said cowling.

* * * * *